Jan. 14, 1969     MASAMICHI HINO     3,421,594
WEIGHING APPARATUS
Filed Nov. 3, 1966     Sheet 1 of 5
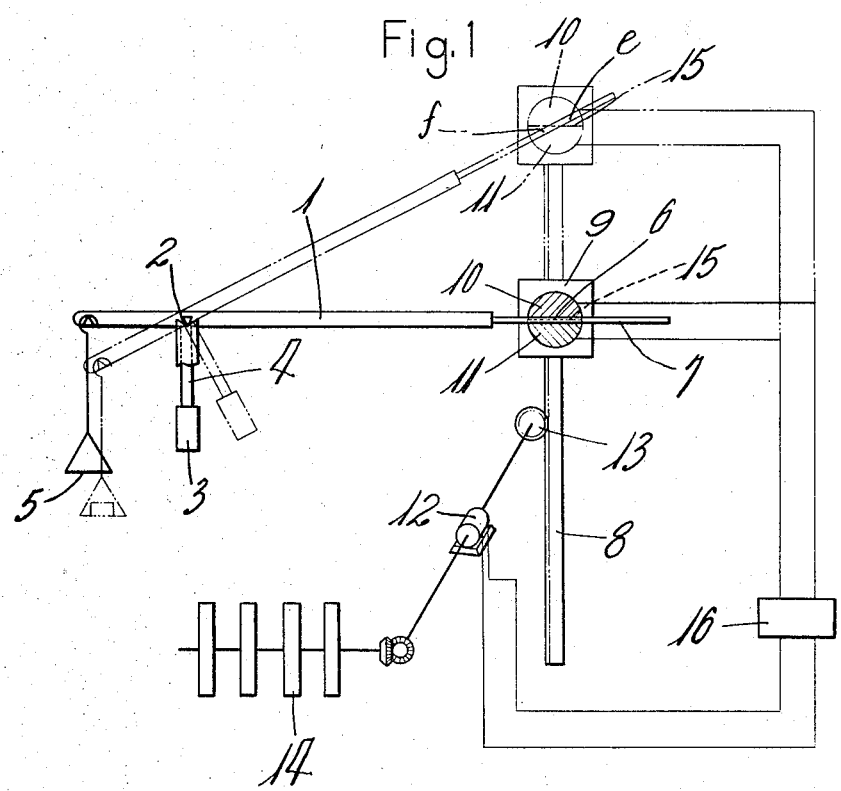
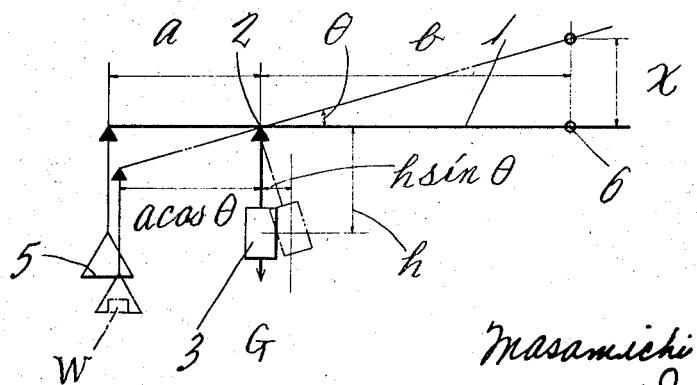

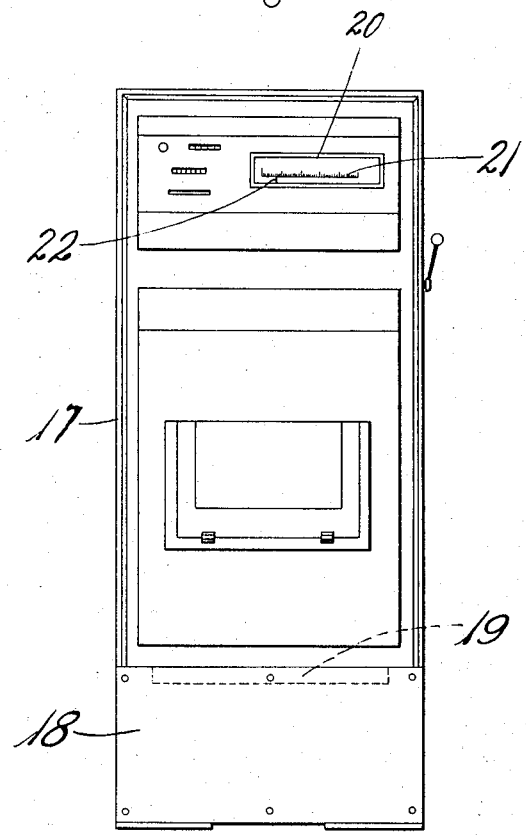

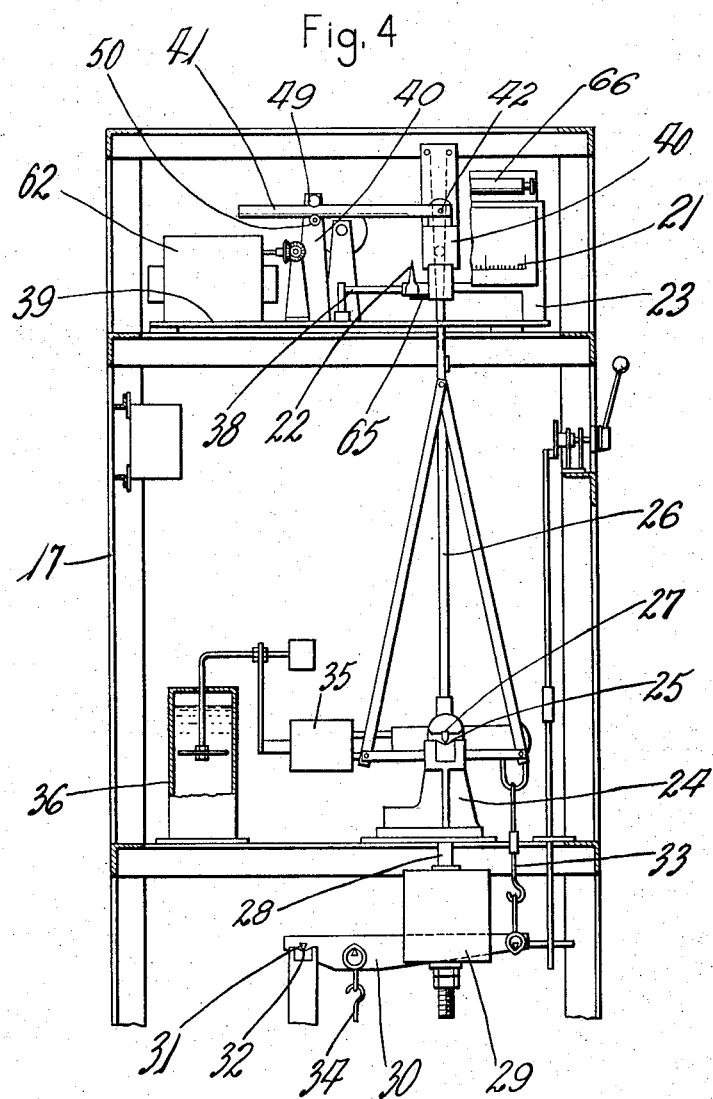

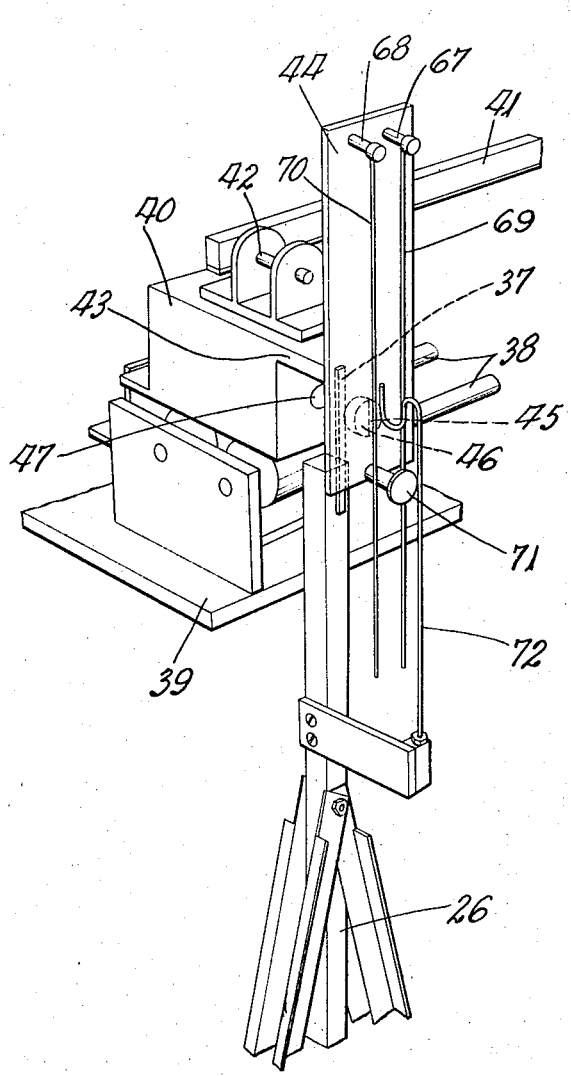

United States Patent Office 3,421,594
Patented Jan. 14, 1969

3,421,594
WEIGHING APPARATUS
Masamichi Hino, Hirakata, Japan, assignor to Kubota Iron and Machinery Works, Ltd., Osaka, Japan
Filed Nov. 3, 1966, Ser. No. 591,811
U.S. Cl. 177—223        4 Claims
Int. Cl. G01g 1/12

ABSTRACT OF THE DISCLOSURE

A weighing apparatus of the so-called pendulum type which has a load carrying means on a weighted beam. A support carrying member extends in a straight line transversely to the beam, and a support is movable along the support carrying member and carries a photoelectric means along the carrying member and a light producing means which directs light toward the photoelectric means. The beam carries a shadow producing member which in the balanced position of the beam casts a shadow on the photoelectric means which causes the photoelectric means to produce no differential signal. Movement of the beam out of the balanced position causes the photoelectric means to produce a differential signal which drives a driving means for moving the support member toward the balanced position.

---

Figure 5:
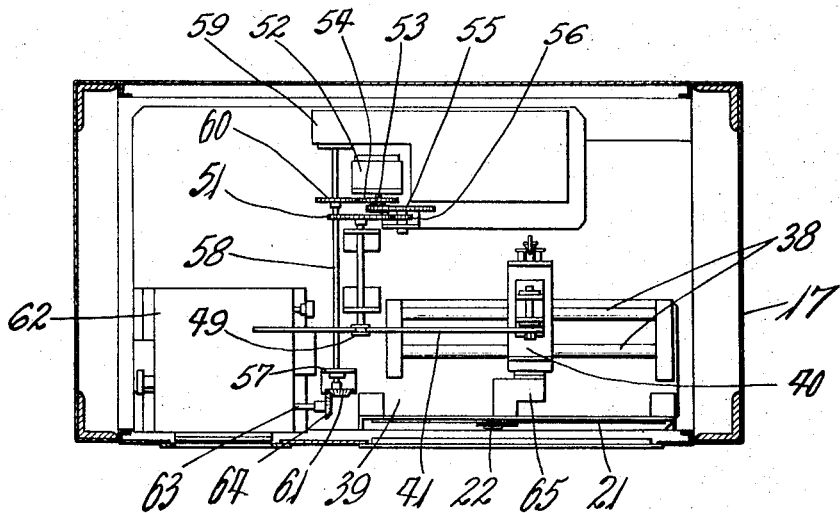

This invention relates to a so-called pendulum system weighing apparatus, capable of carrying out weighing by securing rigidly a weight at a desired portion of a lever which moves with its fulcrum as a center and by inclination of the lever occurring when an article to be weighed is placed at one end of the lever.

In a weighing apparatus of this sort, when the angle of inclination of the lever when a load is applied, that is, an angle of inclination from the position of the lever at no load, is assumed to be the weight of a weighed article is proportional to tan θ.

Up to now, it was extremely difficult to detect readily and to indicate a value proportional to tan θ as stated above. Hence, the weight was shown approximately as an angle of inclination of a lever, or a cam for correcting and the like, capable of turning together with a lever were employed, so that it had too large an error to use at an angle of inclination more than a predetermined angle. There existed, therefore, a deficiency in that an apparatus having a wide weighing range was hard to manufacture. Thus the object of the present invention is to overcome the defects of a pendulum system weighing apparatus as mentioned above.

The present invention is constituted as follows: a sliding supporter is provided which can move along a straight line that intersects at right angles to a straight line connecting a reference point of a lever when the load on the lever is zero with a fulcrum of the lever, which straight line passes through the reference point. The supporter follows the inclination of the lever utilizing a photoelectric device and the travelling distance of the sliding supporter is forced to be proportional to the tangent of an angle θ of inclination of the lever, so that the weight can be indicated as corresponding to the position of the lever. By such method, since the weight can be precisely indicated without adding any mechanical resistance to the lever, such weight indication according to the present invention is exceedingly exact and then there occurs an advantage that the angle of inclination of the lever can be made much wider. Such details will be clarified by the following illustration and drawings.

FIGURE 1 is a sketch explaining the principle of a weighing apparatus according to the present invention. FIGURE 2 is a diagram showing the principle of a pendulum system weighing apparatus. FIGURE 3 is an elevation view of a practical embodiment of a weighing apparatus of the present invention. FIGURE 4 is a sectional elevation view of the internal mechanism of the weighing apparatus shown in FIGURE 3 with lower portion not shown. FIGURE 5 is an enlarged cross-sectional plan view of the same. FIGURE 6 is a perspective view showing a main part of the same.

Referring to FIGURE 1, 1 is a lever, 2 being its fulcrum, 3 being a weight fixed at an end of an arm 4 projecting downwards from the fulcrum portion of the lever 1, and 5 is a loading pan suspended from the left end of the lever 1.

A diagram of said weighing apparatus is shown in FIGURE 2.

In this diagram, assuming the horizontal distance from the fulcrum 2 to the suspending point of the loading pan 5 to be $a$, the horizontal distance from the fulcrum 2 to a reference point 6 situated at the right side of the lever 1 to be $b$, the vertical distance from the fulcrum 2 to the center of gravity of the weight 3 to be $h$, and the weight of the weight 3 to be $G$, respectively when a load is not applied to the pan 5, it is shown as follows that when load W is applied on the loading pan 5 and the lever 1 inclines by an angle $\theta$ as shown in dotted lines, then $$W \cdot a \cdot \cos \theta = G \cdot h \cdot \sin \theta$$

$$W = \frac{G \cdot h}{a} \frac{\sin \theta}{\cos \theta} = A \tan \theta$$

wherein, $$\frac{G \cdot h}{a} = A$$

$$\therefore W = A\frac{x}{b} = B \cdot x$$

wherein, $$\frac{A}{b} = B$$

As mentioned above, load W is proportional to tan $v$ and tan $\theta$ is also proportional to $x$.

Therefore, load W can be determined by measuring length $x$ shown in FIGURE 2.

In FIGURE 1, a reference point 6 shown in FIGURE 2 is positioned at the center line of a shading piece 7 projecting from the right end of the lever 1, on a straight line connecting the fulcrum 2 with the reference point 6 when the load is zero and the lever 1 is horizontal and a support carrying member such as a rack gear 8 movable up and down is mounted so as to pass by along a path adjacent the reference point 6.

At the upper end of said rack gear 8 is fixed a supporter 9, and a pair of photoelectric elements 10, 11, an upper one and a lower one, are secured fixedly on one face of the supporter 9, which is opposed to the shading piece 7.

Said photoelectric elements 10, 11 are composed of a substance, such as e.g. cadmium sulphide which produces current when light falls thereon and the photoelectric elements 10, 11 shown in the figure are semicircular shaped ones having the same area and the same size and are formed by placing the chord portions against each other. But, the elements 10, 11 need not always be semi-circular as long as both elements are symmetrical, such as a square or rectangular form.

A light source is installed at a position spaced from the shading piece 7, and light rays from the light source strike the elements 10, 11 and the shadow of the shading piece 7 is projected upon the elements 10, 11. Then, said light source is caused to travel together with the supporter 9 by being mounted on an arm fixed to the supporter 9.

With said rack gear 8 is meshed a pinion gear 13, driven by a servo-motor, and the rack gear is forced to raise or fall by rotation of the pinion gear 13 by means of the motor 12, and then a weight printer 14 and the like is driven by being connected to the motor 12.

The servo-motor 12 is driven by a difference of output between the photoelectric elements 10, 11.

Namely, since the upper and lower edges of the shading piece 7 are straight lines and parallel to each other, the amount of light falling on the photoelectric elements 10, 11 is equal in the case where the center line of shadow of the shading piece 7 coincides with the contact line 15 between the photoelectric elements 10, 11 or passes through the center of said line.

Namely, in the state shown in full lines in FIGURE 1, the center of the shading piece 7 coincides with that of the contact point 15, so that the shadow of the shading piece 7 falls equally on the elements 10, 11, and even though the lever 1 inclines to the position shown in dotted lines in FIGURE 1 and the shading piece 7 and the contact line 15 intersect diagonally, if the center line of the shadow of the shading piece 7 passes through the center of the contact line 15, the shadow of the shading piece 7 projected onto the photoelectric elements 10, 11 shades equal areas e, f in FIGURE 1, so that the amount of light falling on the elements 10, 11 is also equal.

The elements 10, 11 and the motor 12 are connected with an electronic regulating device 16 which consists of one device in which said individual photoelectric elements 10, 11 are connected to suitable amplifiers in which currents generated from the elements 10, 11 are amplified and compared, a difference between them being utilized as an output voltage and the servo-motor 12 is rotated until the voltage becomes zero, and another device in which a rotational direction is determined by discriminating between the elements 10, 11 as to which has the lower output so that the rack gear 8 is caused to travel toward the element having less light falling thereon.

Being constituted as above-mentioned, in the state shown with full lines in FIGURE 1, currents generated from the elements 10, 11 are equal, consequently the output of the regulating device is zero, so that the motor 12 remains stopped.

If a load is applied on the loading pan 5 in such state, the lever 1 begins to rotate counter-clockwise with the fulcrum as a center, so that the right end of the lever 1 moves upwards.

Because of this movement, the shadow of the shading plate 7 covers the element 10 more than the other, and the current generated by the element becomes smaller and the current from the element 11 larger, so that a difference between currents produced on the elements 10, 11 occurs. Consequently, the motor 12 rotates to raise the rack gear 8 and stops at the place where the amount of light falling on the elements 10, 11 becomes equal.

The distance the rack gear 8 moves owing to such action corresponds to $x$ shown in FIGURE 2, and since rotation of the gear 13 is proportional to $x$, if the number of such rotation is shown by a suitable method, the weight of the load on the loading pan 5 can be known.

Next, explaining an article manufactured according to the present invention, FIGURE 3 is an elevation view showing its external appearance and all mechanisms are contained in a casing 17 and the loading pan 19 is mounted on upper face of a supporting block 18 which projects forward at its lower portion.

At the upper portion of the casing 17 is provided a window 20, through which a scale plate 21 can be observed. A pointer 22 is caused to move sideways on the front face of the plate 21 and indicates the weight of an article on the loading pan 19.

The inside of the casing 17 is constituted as shown in FIGURES 4, 5 and 6. Namely, at an intermediate portion of the casing 17 are located a pair of brackets 24, front and rear, and knife edges 27, projecting from the front and rear of the lower end of a lever 26, are positioned on pivots 25 located at the upper portion of the brackets 24.

The lever 26 is arranged vertically unlike FIGURE 1 and is composed of not one rod, but is a frame member combining several frame elements into a frame. By doing so in spite of having a light weight it has high stiffness.

An arm 28, which is mounted on the lower end of said lever 26, projects downwards between front and rear brackets 24 and a weight 29 is fixed to said arm to be adjustable by a binding screw.

On the lower portion of the lever 26 is located an intermediate lever 30, whose knife edges 31 located at front and rear of the left end thereof are mounted on pivot 32 fixed to the casing 17 and the right end of the lever 30 is connected to the right end of the lower portion of the upper lever 26 by a connecting rod 33.

Also, at one part of the lever 30 is connected the upper end of a connecting rod 34, whose lower end is connected to the loading pan 19. However, the connecting rod 34 is not directly connected to the loading pan 19, but is connected to a lever device located at the lower portion of the loading pan 19, and when a load is applied on the loading pan 19, the load is applied to the lower portion of the lever device, so that the connecting rod 34 is forced to move downwards by the action of the lever device. The mechanism for this portion is omitted in the drawing because it is conventional.

On the left end of the lower end of the lever 26 is mounted an adjustable weight 35 and a damper 36, and on the upper end of the lever 26 is mounted a projecting shading piece 37.

On a mounting plate 39 fixed to the upper portion of the casing 17 are two rails 38, 38 extending in a horizontal direction, and on said rails 38, 38 is slidably mounted a traveling block 40 and to the upper portion of said sliding block 40 is pivoted on a shaft 42 another end of a rack gear 41 having teeth on its lower side. In FIGURE 6, the left end of the rack gear 41 is pivoted to the block 40 on the shaft 42. This is because this drawing is a view from the back side of FIGURE 4.

To an arm 43 projecting rearwardly from the upper portion of said block 40 is fixed the middle part of a mounting plate 44 made from electrically insulating material, photoelectric elements 45, 46 being fixed to inner face thereof, and their mounting position being on the lower portion of the arm 43 and at a position opposite to the rear face of the travelling block 40 and the contact line between the elements 45, 46 is perpendicular.

On the rear portion of the block 40 opposite to said elements 45, 46 is provided a light source 47, light from said source being caused to strike the elements 45, 46 and a shading piece 37 is located at the upper end of said lever 26 between said light source 47 and the elements 45, 46, and is arranged to be out of contact with the travelling block 40, the elements 45, 46 and the arm 43.

On a supporting frame 48 mounted vertically on the mounting plate 39, is a grooved pulley 49 acting as a guide, and which rotates in contact with the upper side of the rack gear 41, and a pinion gear 50, which rotates in meshing engagement with the teeth on the lower portion of the rack gear 41. The shaft of pinion gear 50 extends rearwardly and a gear 51 is fixed to the extending part.

On the rear part of the mounting plate 39 is fixed a servo-motor 52, and has gears 53 and 54 fixed to the shaft thereof, gear 53 being meshed with a gear 55 fixed to a freely rotatable intermediate shaft provided on the plate 39. A gear 56 connected to said gear 55 is meshed wtih said gear 51. Thus, revolution of the motor 52 is transmitted at a reduced speed to the gear 50 through the gears 53, 55, 56 and 51.

A freely rotatable shaft 58 supported on another supporting frame 57 to the side of the supporting frame 48 extends rearwardly and is supported on the casing 59, and a gear 60 fixed at one part of the shaft 58 is meshed with said gear 54 and a bevel gear 61 at the front end of the shaft 58 is engaged with a bevel gear 64 at one end of a shaft 63 of a weight printer 62 fixed at the left and front portion on the mounting plate 39.

The top end of a projecting piece 65, which projects forward from the front and lower portion of said travelling block 40, projects in front of a scale containing plate 21 through the lower side of the plate 21 and a pointer 22 is fixed to the top end of the projecting piece 65 and lies in front of the plate 21 extending upwardly from below the plate.

Said plate 21 is mounted on legs at both ends on the mounting plate 39 and there exists a gap between the plate 39 and the plate 21, so that the projecting piece 65 is capable of passing through under the plate 21, and a lamp 66 is provided at the upper portion of the plate 21 to illuminate the front of the plate 21.

On the rear face of the upper end of said mounting plate 44 are located a pair of terminals 67, 68, right and left, to which the upper ends of lever-shaped metallic contact wires 69, 70 are fixed, and at the lower end of the rear face of the plate 44 is rigidly mounted a receiving piece 71 made from electrically insulating material and elastic forces acting inwards are given to said metallic contact wires 69, 70 so that they will contact said receiving piece 71.

Also, at the upper end of said lever 26 is rigidly secured a metallic contact wire 72, having the top end bent forwards and inserted between said wires 69, 70 in such manner that when the shadow of a shading piece 37, caused by light from the light source 47 does not fall on both photoelectric elements 45, 46, the wire 72 contacts either of the wires 69, 70, while when the shadow of the shading piece 37 falls on the photoelectric elements 45, 46, the wire 72 contacts neither of the wires 69, 70.

The photoelectric elements 45, 46 and the motor 52 are connected by a controlling device the same as in FIGURE 1 in such manner that when both elements receive equal amounts of light, the motor stops, and when the amounts of light are unequal, the rack gear 41 travels toward the photoelectric element having less light thereon.

Also, when movement of the lever 26 is excessive and the shadow of the shading piece 37 does not fall on either photoelectric elements 45, 46, the wire 72 on the lever 26 contacts either of the wires 69, 70 on the mounting plate 44. In such case, a difference between outputs of the photoelectric elements 45, 46 remains zero, but the wires 69, 70, 72 and the motor 52 are connected by the controlling device in such manner that the motor 52 is driven to cause the rack gear 41 to travel in a direction where the wire 72 contacts either one of the wires 69, 70. However, this device is only one example, and other various methods may be used for achievement of the same purpose.

The operation of said weighing apparatus is as follows; when a load is applied on the loading pan 19, the connecting rod 34 moves downwards, and the lever 30 turns downwards causing contact between the knife edge 31 and the pivot 32 as a center and allows the connecting rod 33 to be pulled downwards. Then, when the connecting rod 33 moves downwards, the lever 26 turns clockwise causing contact between the knife edge 27 and the pivot 25 as a center. The shading piece 37 at the upper end thereof travels to the right and the shadow of the shading piece 37 projected on the photoelectric elements 45, 46 travels to the right, so that the controlling device operates, the motor 52 being driven, the travelling block 40 following movement of the lever 26 through gears 53, 55, 56, 51, 50 and the rack gear 41, and when the lever 26 stops and the shadow of the shading piece 37 falls equally on the photoelectric elements 45, 46, the motor 52 stops, then the travelling block 40 stops, and this position is shown as a weight value on the plate 21 by the pointer 22. And, as mentioned above, when the motor 52 is driven, its revolution is transmitted to the shaft 63 of the weight printer 62 through the gears 54, 60, the shaft 58 and the bevel gears 61, 64. So, a weight value is indicated digitally and printed on a card by operation of the printer 62.

Also, by electrical remote control of the motor 52, remote indicating for weight can be achieved.

The lever 26 is constituted so as to be perpendicular when half of the maximum load to be weighed by this weighing apparatus is applied. This is due to the provision of a wider weighing range. By such a method, when the load is zero the lever 26 inclines all the way to the left in FIGURE 4, while when the load is maximum it inclines all the way to the right, so that even if the turning range of the lever 26 is made wider, the travelling range of the shading piece 37 toward a vertical direction can be made narrow.

Since the present invention is constituted in such manner that weighing value is caused to be indicated by mounting a travelling pointer which moves linearly corresponding to turning of the lever as mentioned above, an exact weight measurement, which contains no error theoretically, can be achieved and the weighing range can be made wider.

Moreover, the present invention has such characteristics that since it is allowed to follow the travelling member corresponding to movement of the lever by utilizing a photoelectric device, mechanical contact between the lever and the travelling member never exists, so that there is no fear that resistance owing to movement of the lever occurs and no weighing error is produced.

What I claim is:

1. A weighing apparatus comprising a beam pivotally mounted for pivotal movement around a fulcrum and having a pendulum weight thereon, a load carrying means coupled to said beam for pivoting said beam in one direction around said fulcrum, a support carrying member extending in a straight line transversely to said beam, a support movable along said support carrying member, a photoelectric means on said support for producing a differential signal when light falls unevenly thereon, a support driving means coupled to said support and to said photoelectric means for driving said support toward a balanced position when a differential signal is produced, light producing means movable parallel to said support carrying member spaced from and directed toward said photoelectric means, and a shadow producing member on said beam between said photoelectric means and said light producing means and in all the balanced load conditions of said apparatus throwing a shadow on said photoelectric means which causes said photoelectric means to produce no differential signal, whereby the pivotal movement of the beam is accurately translated into rectilinear movement along said transverse support carrying member and the load on the beam can be accurately measured as a function of the tangent of the angle through which the load moves the beam from an initial rest position of no load.

2. An apparatus as claimed in claim 1 in which said support carrying member is perpendicular to said beam in the no load initial position of said beam.

3. An apparatus as claimed in claim 1 in which said light producing member is mounted on said support.

4. An apparatus as claimed in claim 1 in which said photoelectric means comprises a pair of adjacent semiconductor elements which are mirror images of each other and are separately electrically connected to said driving means, said shadow producing member intersecting the line between said elements at the midpoint thereof in load balanced conditions of said beam.

References Cited

UNITED STATES PATENTS

| | | | |
|---|---|---|---|
| 3,061,027 | 10/1962 | Berge et al. | 177—210 X |
| 3,106,978 | 10/1963 | Cahn | 177—210 |
| 3,118,068 | 1/1964 | Duchene et al. | 250—231 |
| 3,189,111 | 6/1965 | Ast | 177—178 |
| 3,193,032 | 7/1965 | Martin | 177—178 |

FOREIGN PATENTS 461,651 2/1937 Great Britain.

RICHARD B. WILKINSON, *Primary Examiner.*

GEO. H. MILLER, JR., *Assistant Examiner.*

U. S. Cl. X.R.

177—046